United States Patent [19]
Orth, Jr. et al.

[11] 4,113,831
[45] Sep. 12, 1978

[54] RECOVERY OF SODIUM FLUORIDE AND OTHER CHEMICALS FROM SPENT CARBON LINERS

[75] Inventors: George Otto Orth, Jr.; Richard D. Orth, both of Seattle, Wash.

[73] Assignee: National Fluoride and Chemical Corporation, Seattle, Wash.

[21] Appl. No.: 618,958

[22] Filed: Oct. 2, 1975

[51] Int. Cl.$^2$ .............................................. C01F 7/04
[52] U.S. Cl. .................................. 423/119; 423/129; 423/184
[58] Field of Search ............... 423/184, 185, 630, 499, 423/122, 129, 127, 116, 119, 120, 121

[56] References Cited

U.S. PATENT DOCUMENTS

| 0,691,470 | 1/1902 | Jordan | 423/630 |
| 0,941,799 | 11/1909 | McCulloch | 423/630 |
| 1,871,723 | 8/1932 | Morrow | 423/116 |
| 2,714,053 | 7/1955 | Albert et al. | 423/116 |
| 2,732,283 | 1/1956 | Clukey | 423/116 |
| 3,000,702 | 9/1961 | Cunningham | 423/490 |
| 3,106,448 | 10/1963 | Whicher et al. | 423/116 |

Primary Examiner—O. R. Vertiz
Assistant Examiner—Wayne A. Langel
Attorney, Agent, or Firm—Seed, Berry, Vernon & Baynham

[57] ABSTRACT

Floride and aluminum values, as well as carbon, are recovered from waste cathode liner material from aluminum electrolytic cells by leaching of the liner at ambient temperature with a caustic solution, followed by precipitation of sodium fluoride by saturating the leach liquor with a compound which suppresses the solubility of sodium fluoride in the leach liquor. Ammonia is a preferred compound. Aluminum compounds, as well as the carbon values, are also recovered. Treating chemicals used in the process are recycled. The process is essentially a closed-cycle process with substantially no discharge of effluent.

7 Claims, 2 Drawing Figures

A. COUNTER CURRENT LEACHING

B. SODIUM FLUORIDE PRECIPITATION

C. AMMONIA RECOVERY

D. ALUMINUM REMOVAL

RECOVERY OF SODIUM FLUORIDE AND OTHER CHEMICALS FROM SPENT CARBON LINERS

BACKGROUND OF THE INVENTION

1. Field of the Invention

This invention relates to the recovery of fluoride, aluminum and carbon values from waste cathode liner material used to line aluminum electrolytic cells.

2. Prior Art Relating to the Disclosure

Cathode pots of electrolytic furnaces used in the production of aluminum are lined with side carbon and bottom carbon compositions which are electrically conductive. The bottom carbon is generally of graded anthracite coal and coke bonded together with pitch. During electrolytic operation, the cryolite components, rich in sodium and fluoride values, are slowly absorbed into the lining. Eventually the cathode liners foul to the point where they must be replaced. The spent cathode liners contain substantial amounts of fluoride values, aluminum in the form of aluminates, sodium fluoride, and absorbed sodium metal which, on exposure to atmospheric moisture, is converted to a caustic. Other materials, such as the anthracite carbon contained in the monolith spent liner, are valuable. The monolith liner is composed of sidewalls and a bottom wall, with the bottom wall containing the anthracite carbon and constituting about two-thirds of the total weight of the cathode lining. Disposal of the spent potliner has posed a problem due to the leaching of fluorides and other contaminants into ground water.

Methods for recovering cryolite from spent cathode liners are known. Such methods have generally employed (1) caustic (sodium hydroxide,), (2) sodium carbonate, or (3) water to extract the fluoride values from used cathode liners. By the first process, crushed carbon cell lining is treated with an aqueous caustic solution to yield water-soluble sodium fluoride and water-soluble sodium aluminate. This solution is processed to precipitate cryolite. Such methods are described in U.S. Pat. Nos. 1,871,723 and 2,732,283.

By the second process, crushed carbon liners are treated at elevated temperature with a water-soluble carbonate to effect reaction between the fluoride values in the spent liner and the added carbonate. The fluorides in the spent liner are converted to water-soluble sodium fluoride and precipitated with carbon dioxide to form a cryolite. Such a method is disclosed in U.S. Pat. No. 3,106,448.

By the third method, water is used to leach the fluoride values from the spent cathode liner.

U.S. application Ser. No. 520,304, filed Nov. 4, 1974, assigned to the assignee of this application and now abandoned, describes a system for extraction and recovery of the aluminum and fluoride values from spent cathode liners by extracting crushed liner material at ambient temperature with a dilute ammonia solution. Sodium fluoride and cryolite are recovered by evaporation of the ammonium hydroxide leach liquor. Alternatively, the sodium fluoride in the leach liquor is precipitated as calcium fluoride. The principal disadvantage of this process is the energy requirement required to concentrate the dilute solution concentrations.

Removal of soluble fluoride from cathode liner minimizes the subsequent leaching of toxic fluorides into ground water in the vicinity of liner disposal sites. In addition, the recovered fluoride is of value and the recovered liner material may be recycled.

SUMMARY OF THE INVENTION

It is a primary object of this invention to provide a process for the recovery of fluoride values from used cathode liners as sodium fluoride.

It is a further object of this invention to provide a process for the isolation of fluoride values from spent cathode liners and the recovery of aluminum values as aluminum hydrates, with the water, caustic and other treating chemicals used in the process recycled to give an essentially effluent-free system.

It is a further object of this invention to provide a process for the isolation of fluoride values from spent cathode liners as sodium fluoride by extracting the fluoride values from the liner with a dilute caustic solution and suppressing the solubility of sodium fluoride in the caustic solution in the presence of sodium aluminates and other substances with ammonia or other solubility suppressant.

It is a further object of this invention to provide a system for the recovery of sodium fluoride from the caustic extract of spent cathode liner by the addition of ammonia or other solubility suppressant for sodium fluoride, followed by precipitation of aluminum hydrates with carbon dioxide, with recovery and recycle of caustic and the solubility suppressant.

It is a further object of this invention to recover fluoride values from spent potliner under ambient temperature conditions, thereby minimizing energy costs.

These and other objects are carried out by extracting crushed cathode liner material to yield an extractant solution containing soluble aluminum and fluoride values, adding a solubility suppressant to the extractant solution in amounts sufficient to precipitate the fluoride values, and recovering the fluoride values. Aluminum values are recovered by the addition of carbon dioxide to the extractant solution in an amount sufficient to precipitate the aluminum values as aluminum hydrates. Caustic and solvent added to suppress solubility of the sodium fluoride in the process are recovered for recycle and reuse.

DESCRIPTION OF THE PREFERRED EMBODIMENTS

Spent cathode liner from aluminum electrolytic cells is crushed to particulate form for removal of the fluoride and aluminum values contained therein. The smaller the particle size, the more complete the removal of the fluoride and aluminum values. Particle sizes ranging from one-eighth inch to one-half inch may be used, preferably about one-quarter inch. Extraction of the fluoride values from the crushed cathode liner may be accomplished by a number of extraction systems: alkaline aqueous solution, water plus the caustic present in the liner; pressurized steam; or caustic or sodium carbonate roast followed by water extraction. Preferably the extraction is accomplished using a dilute aqueous caustic solution. The caustic extraction may be carried out at temperatures ranging up to about 100° C. Where sodium fluoride is the preferred product to be recovered, ambient temperature leaching of the fluoride values from the crushed cathode liner is preferred to minimize energy costs and the amount of sodium aluminate in the leach liquor. Removal of fluorides appears to be only slightly reduced by extraction at ambient temperature. The concentration of the caustic in the extract solution may range from one to ten percent by weight, preferably about two percent by weight. Sodium aluminate and sodium fluoride are the major reaction products of the leaching step. Typical reactions which occur as a result of extraction with caustic are as follows:

$$Na_3AlF_6 + 4NaOH \rightarrow 6NaF + NaAlO_2 + 2H_2O$$

$$AlN + NaOH + H_2O \rightarrow NaAlO_2 + NH_3$$

$$Al_4C_3 + 4NaOH + 4H_2O \rightarrow 4NaAlO_2 + 3CH_4$$

$$2Al + 2NaOH + 2H_2O \rightarrow 2NaAlO_2 + 3H_2$$

The solubility of sodium fluoride in water is about 41 g/l and is reduced by the presence of caustic. The quantity of leach solution required to extract the fluoride values from the spent cathode liner depends on the fluoride concentration of the liner and the concentration of sodium hydroxide in the extractor solution. With a two percent by weight caustic solution, between four to ten pounds extractor solution per pound of cathode liner material are generally adequate.

Figure 1:
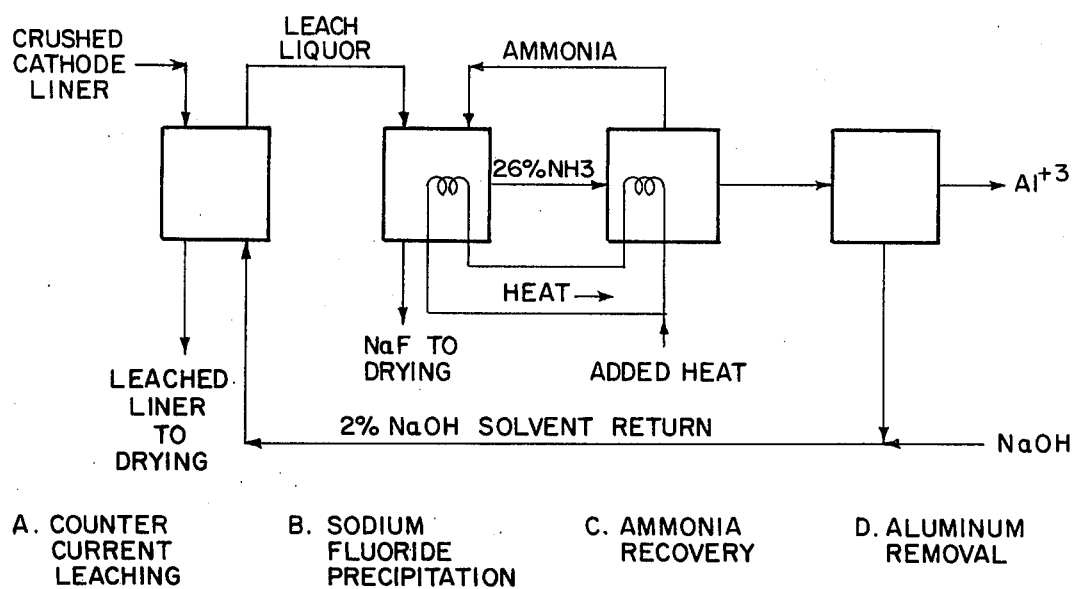

To obtain an adequate concentration of fluoride values in the extractor solution, countercurrent extraction of the crushed cathode liner is preferred. Referring to FIG. 1, the caustic extractor solution is passed upward through the crushed liner material contained in one or more extraction zones 10. The leach liquor from the extraction zone or zones contains, principally, sodium aluminate and sodium fluoride.

The sodium fluoride contained in the leach liquor is recovered by the addition of a solubility suppressant for sodium fluoride to the leach liquor. Anhydrous ammonia is a preferred solubility suppressant because it is inexpensive, alkaline, well known, stable and easily recovered from water. It also precipitates large crystals of sodium fluoride. The use of ammonia as a solubility suppressant to precipitate sodium fluoride from the leach solution of spent cathode liner is a unique way of recovering sodium fluoride. Although it is known that ammonia depresses the solubility of sodium fluoride in water, this fact has never been made use of in a recovery system as described. U.S. Pat. No. 3,000,702 utilizes the discovery that the presence of ammonium hydroxide in aqueous solutions depresses the solubility of sodium fluoride in water. This is used in the manufacture of sodium fluoride from fluosilic acid, a waste product from the manufacture of superphosphate, phosphoric acid and the purification of graphite.

Sufficient ammonia is added to the leach liquor to saturate it. About ninety percent or more of the fluoride values present in the leach liquor is precipitated by the addition of ammonia with little or no precipitation of contaminants, such as cryolite, ammonium cryolite, alumina or other chemicals.

Other solubility suppressants for sodium fluoride contained in the leach liquor may be used; however, these other solvents do not appear to have the advantages of ammonia. Other solvent solubility suppressants which may be used include primary and secondary amines, acetone, monohydric or polyhydric alcohols having from one to four carbon atoms, and sodium salts, such as sodium hydroxide, sodium carbonate, sodium phosphate and sodium sulfate. Specific solvents showing solubility suppression effects when added to an aqueous solution saturated with sodium fluoride include: ethanol, mono-isopropanol amine, pyridine, morpholine, dimethylformamide, ethylenediamine, ethylene glycol, methanol, acetone, isopropanol and n-butyl alcohol.

Referring to FIG. 1, ammonia added to the leach solution contained in the absorption zone 20 precipitates sodium fluoride from the solution, which is removed for drying. The leach solution saturated with ammonia (about twenty-six percent by weight) is then removed to a stripping zone 30 where heat is applied to the solution to drive off the ammonia, which is recycled to the absorption zone 20 for treatment of incoming leach solution. The absorption zone may be operated at atmospheric pressure or at a higher pressure if desired. Operating at an increased pressure favors absorption. The heat of solution evolved during absorption by the solution of ammonia is available for use for stripping the ammonia from the solution in the stripping zone. The stripping zone, when operated at reduced pressure, favors ammonia removal from the leach solution at lower temperatures. Much of the heat of vaporization needed in the stripping zone can be provided by the absorption zone.

Following precipitation and removal of the fluoride as sodium fluoride from the leach solution, the aluminum values can be removed from the leach solution by precipitation as aluminum hydrates using carbon dioxide from stack gases or other source. The leach solution containing sodium aluminate is saturated with carbon dioxide at a temperature of from 50°-100° C. to produce filterable aluminum hydrates. The reactions are as follows:

$$2NaAlO_2 + CO_2 \rightarrow Na_2CO_3 + Al_2O_3$$

$$2NaOH + CO_2 \rightarrow Na_2CO_3 + H_2O$$

The solution remaining after removal of the aluminum values contains principally sodium carbonate. Caustic can be manufactured from the sodium carbonate solution by the well-known soda/lime reaction, as per the following equation:

$$Na_2CO_3 + Ca(OH)_2 \rightarrow 2NaOH + CaCO_3$$

This reaction is well known and runs almost to completion with dilute sodium carbonate solutions. The calcium carbonate produced may be burned to regenerate lime for reuse in the process or washed and dried for sale. The sodium hydroxide recovered is recycled to the extraction zone for treating additional crushed cathode liner.

The system is essentially effluent-free. Some caustic makeup is required as the sodium/fluorine ratio in the overall cathode liner is less than 1.21 while the sodium/fluorine ratio of sodium fluoride is 1.21. Thus, a small amount of caustic must be added to the extraction system if one hundred percent of the sodium and fluoride values are to be extracted from the cathode liner.

The following examples are illustrative of the process claimed but are not intended to be limiting in any manner.

EXAMPLE I

| | |
|---|---|
| cryolite | 16.6% by weight |
| sodium fluoride | 11.0% by weight |
| sodium carbonate | 7.0% by weight |
| sodium hydroxide | 3.0% by weight |
| caustic soluble alumina | 11.0% by weight |

-continued

| | |
|---|---|
| inert alumina | 26.6% by weight |
| carbon or similar carbonaceous material | 20.0% by weight |

A leach liquor was prepared by extracting side carbon with a boiling solution of 2% sodium hydroxide for two hours. Analysis of the solution indicated the following: 15.1 g/l fluoride, 27.9 g/l sodium, 7.75 g/l aluminum as aluminum oxide ($Al_2O_3$). The solution was then saturated with ammonia. 90% of the fluoride was recovered as sodium fluoride and 96.3% of the aluminum found by analysis in the saturated ammonia solution.

EXAMPLE II

Figure 2:
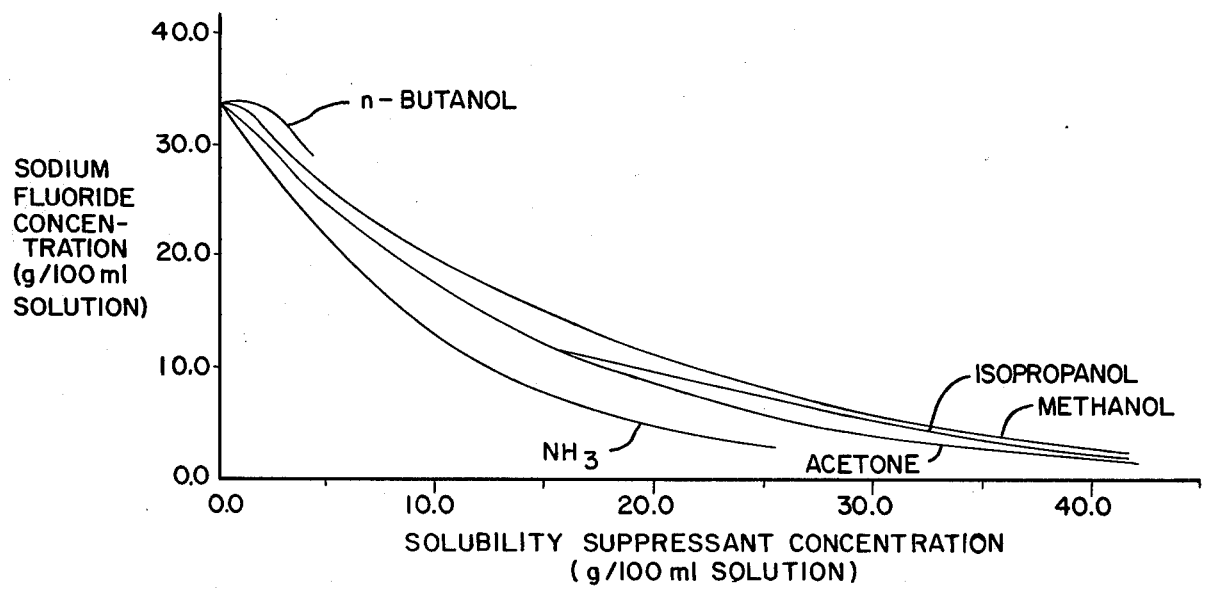

Solubility suppressants for sodium fluoride other than ammonia were used to precipitate sodium fluoride from a liquor obtained by saturating a 2% NaOH solution with NaF. The following data indicates the percent sodium fluoride precipitated on addition of the various solubility suppressants to the leach liquor. The solubility suppressants employed included methyl alcohol, isopropyl alcohol, n-butyl alcohol and acetone. The results are also shown graphically in FIG. 2.

| Methyl Alcohol/2% Aq. NaOH | | | |
|---|---|---|---|
| g. MeOH Added to 100 ml. Leach Solution | g. MeOH/100 ml. | g. NaF/100 ml. | %NaF ppt. |
| 0.0 | 0.00 | 3.29 | 0.0 |
| 1.99 | 1.95 | 3.14 | 2.9 |
| 3.97 | 3.80 | 2.70 | 14.2 |
| 7.94 | 7.36 | 2.20 | 27.9 |
| 39.6 | 27.0 | 0.670 | 70.1 |
| 79.3 | 40.8 | 0.237 | 86.0 |
| Isopropyl Alcohol/2% Aq. NaOH | | | |
| g. IPA Added to 100 ml. Leach Solution | g. IPA/100 ml. | g. NaF/100 ml. | %NaF ppt. |
| 0.0 | 0.00 | 3.29 | 0.0 |
| 1.96 | 1.92 | 3.14 | 2.2 |
| 3.93 | 3.77 | 2.61 | 17.5 |
| 7.85 | 7.22 | 2.07 | 31.5 |
| 19.6 | 16.1 | 1.08 | 60.0 |
| 39.3 | 28.1 | 0.544 | 76.9 |
| 78.5 | 40.7 | 0.170 | 90.0 |
| n-Butyl Alcohol/2% Aq. NaOH | | | |
| g. n-BuOH Added to 100 ml. Leach Solution | g. n-BuOH 100 ml. | g. NaF/100 ml. | %NaF ppt. |
| 0.0 | 0.0 | 3.29 | 0.0 |
| 1.01 | 1.00 | 3.25 | 0.0 |
| 2.02 | 1.98 | 3.21 | 0.0 |
| 3.04 | 2.93 | 3.18 | 0.0 |
| 4.05 | 3.86 | 2.87 | 8.4 |
| 5.06 | 4.42 (sat.) | 2.69 | 13.6 |
| Acetone/2% Aq. NaOH | | | |
| g. Acetone Added to 100 ml. Leach Solution | g. Acetone/ 100 ml. | g. NaF/100 ml. | % NaF ppt. |
| 0.0 | 0.0 | 3.29 | 0.0 |
| 1.96 | 1.93 | 2.94 | 9.2 |
| 3.92 | 3.75 | 2.65 | 15.8 |
| 7.85 | 7.14 | 2.10 | 30.2 |
| 19.6 | 16.1 | 1.11 | 58.9 |
| 39.2 | 27.1 | 0.477 | 79.0 |
| 78.5 | 41.2 | 0.105 | 93.9 |

EXAMPLE III 1,000 g. of crushed sidewall carbon were mixed with 6,000 ml. water and slowly agitated for eighteen hours. 5,676 ml. of leach liquor were recovered from the sidewall carbon by filtration in a Buchner funnel. The leach liquor contained 17.5 g/l sodium and 13.1 g/l fluoride. The initial sidewall carbon contained 20.9% sodium and 19.6% fluoride.

3,000 ml. of the leach liquor were then concentrated by evaporation in a beaker to a concentration of 25.5 g/l sodium and 20.0 g/l F. Ammonia gas was then bubbled into the solution until the solution became saturated in ammonia (15.0 N). The resulting precipitate was removed by filtration and dried at 110° C. 69.6 g. of sodium fluoride were recovered, averaging 54.5% sodium and 45.3% fluoride. 2,173 ml. of ammonia solution were recovered and contained 3.75 g/l sodium and 1.52 g/l fluoride.

The embodiments of the invention in which a particular property or privilege is claimed are defined as follows:

1. A method for recovering the fluoride and aluminum contained in used cathode carbon liner from electrolytic cells used in the refining of aluminum, comprising:

extracting crushed liner material containing fluoride and aluminum with a caustic solution in an extraction zone to yield an extraction solution containing solubilized sodium aluminate and sodium fluoride, adding a solubility suppressant to the extraction solution containing the sodium fluoride which suppresses the solubility of the fluoride and causes precipitation of sodium fluoride, recovering the sodium fluoride from the extraction solution, contacting the remaining extraction solution containing the sodium aluminate with carbon dioxide to precipitate the aluminum as aluminum hydrates, leaving a residual solution containing sodium carbonate, and regenerating the caustic solution from the residual solution for recycle to the extraction zone by adding calcium hydroxide to the residual solution.

2. The method of claim 1 wherein the solubility suppressant is ammonia.

3. The method of claim 1 wherein the solubility suppressant is one selected from the group consisting of monohydric or polyhydric alcohols having from one to four carbon atoms, primary and secondary amines, sodium salts and acetone.

4. The method of claim 1 wherein the solubility suppressant is ammonia and the extraction solution is saturated with ammonia in an absorption zone to precipitate sodium fluoride from the extraction solution and wherein the extraction solution containing ammonia is heated to drive off the ammonia for recovery utilizing heat generated by absorption of ammonia in the extraction solution.

5. A method for recovering the fluoride and aluminum contained in used cathode carbon liner from electrolytic cells used in the refining of aluminum, comprising:

extracting crushed liner material with an aqueous caustic solution in an extraction zone to yield an extraction solution containing solubilized sodium aluminate and sodium fluoride, saturating the extraction solution with ammonia in an absorption zone to precipitate sodium fluoride, recovering the sodium fluoride from the extraction solution, contacting the extracting solution containing sodium aluminate with carbon dioxide to precipitate the aluminum as aluminum hydrates, recovering the ammonia from the extraction solution for recycle to the absorption zone, and recovering the caustic in the extraction solution for recycle to the extraction zone.

6. The method of claim 5 wherein the aqueous extraction solution contains 1-5% by weight sodium hydroxide.

7. A method for recovering the fluoride and aluminum contained in spent cathode carbon liner from electrolytic cells used in the refining of aluminum, comprising:

extracting the fluoride contained in crushed carbon liner by subjecting the crushed liner to continuous, multistage, countercurrent extraction with a caustic solution at ambient temperature, to yield an extraction solution containing solubilized sodium aluminate and sodium fluoride, saturating the extraction solution with ammonia in an absorption zone to precipitate sodium fluoride, recovering the sodium fluoride from the extraction solution, contacting the extraction solution containing sodium aluminate with carbon dioxide to precipitate the aluminum as aluminum hydrates, recovering the ammonia from the extraction solution for recycle to the absorption zone, and recovering the caustic in the extraction solution for recycle to the extraction zone.

* * * * *